United States Patent
Batey

(10) Patent No.: US 6,309,744 B1
(45) Date of Patent: Oct. 30, 2001

(54) ADHESIVE FOIL FOR WINDSCREEN PROTECTION

(75) Inventor: Sandra Batey, Glossop (GB)

(73) Assignee: SCAPA Group PLC, Blackburn (GB)

( * ) Notice: Subject to any disclaimer, the term of this patent is extended or adjusted under 35 U.S.C. 154(b) by 0 days.

(21) Appl. No.: 09/554,605

(22) PCT Filed: Dec. 3, 1998

(86) PCT No.: PCT/GB98/03581

§ 371 Date: Aug. 23, 2000

§ 102(e) Date: Aug. 23, 2000

(87) PCT Pub. No.: WO99/28400

PCT Pub. Date: Jun. 10, 1999

(30) Foreign Application Priority Data

Dec. 4, 1997 (GB) .................................... 9725568

(51) Int. Cl.[7] ................ B60J 11/00; C09J 7/02
(52) U.S. Cl. ............. 428/337; 150/168; 160/370.21; 296/95.1; 428/341; 428/355 RA; 428/355 AC; 428/355 N; 428/442
(58) Field of Search .......... 150/168; 160/370.21; 296/95.1; 428/337, 341, 355 RA, 355 AC, 355 N, 442, 31; 427/154, 156

(56) References Cited

U.S. PATENT DOCUMENTS 5,002,326 3/1991 Westfield et al. .............. 296/95.1

FOREIGN PATENT DOCUMENTS 0 519 278 12/1992 (EP) .
0 770 654 5/1997 (EP) .

OTHER PUBLICATIONS

Database WPI; Section CH, Week 9743, Derwent Publications Ltd. London, GB, Class A81, AN 97–466311; XP002095573 & JP 09 217044 A (Bikkiman YG), Aug. 19, 1997.

*Primary Examiner*—D. S. Nakarani
(74) *Attorney, Agent, or Firm*—Jacobson Holman, PLLC

(57) ABSTRACT

A protective cover (13) for windscreens of vehicles comprises a single layer polypropylene base sheet (16) and an acrylate adhesive layer (18). The cover extends over the glazed windscreen and at least a portion of the surrounding frame. The film (13) serves to protect the windshield against damage during transport from factory to showroom and can be easily removed on arrival.

11 Claims, 1 Drawing Sheet

ADHESIVE FOIL FOR WINDSCREEN PROTECTION

BACKGROUND OF THE INVENTION

1. Field of the invention

This invention relates to means for protection of vehicle windscreens, particularly during transit.

2. Prior Art

It is known, for example from EP-A-519278 (Nitto Denko) to cover the bodywork and attachments such as fenders of vehicles with adhesive film or cloth sheets to protect against damage during transport or shipping of the vehicle.

It has been found that in practice, when transporting vehicles in long ocean voyages, it is inevitable that water will find its way into the hold, and drip onto the windscreen of a vehicle. Such water will contain iron oxide due to contact with rusted surfaces within the ship and this oxide can permanently stain and damage a windscreen, particularly when a horizontal trap associated with the windscreen, such as a lower edge seal, catches the dripping water and holds it for a long time to leave behind an iron oxide residue.

Currently available protractive films or cloths are not suitable for use, since it is impracticable to apply them onto the windscreens after the vehicles have been loaded onto the ship. it is the usual procedure to apply all protective films or sheets just before leaving the factory. Since the vehicles have to be driven onto and from the ship, a typical protective film or cloth is unsuitable for use to cover the windscreen since it obscures the driver's vision.

It is a further requirement that any cover applied to the windscreen should be sufficiently abrasion resistant to withstand wiper action, in case the car is unloaded or loaded in bad weather. Ruching or peeling of the cover by the windscreen wipers will damage or remove the cover and compromise its effectiveness.

U.S. Pat. No. 5,002,326 proposes a windscreen cover of a multiplicity of polycarbonate film sheets non-permanently bonded by pressure sensitive adhesive. 12 to 16 sheets are suggested. As each exposed film is worn and degraded by exposure it is removed to expose the next film below. The initially rather thick layer is not suitable for use as a temporary cover for vehicles in transit and also the material chosen is likely to degrade due to UV exposure.

Any adhesive used must be strong enough to stick the cover to the windscreen during use of the wipers, yet be sufficiently easily releasable to remove the cover without leaving an adhesive residue on the glass.

SUMMARY OF THE INVENTION

No windscreen cover has so far been produced which is able to satisfy all these requirements, and it is an object of the invention to provide such a windscreen cover.

EP-A-770654 describes a coloured film comprising a transparent film with a coloured adhesive layer. In dim light such as obtaining in a ship's hold, such a film will unduly impair the driver's vision.

The invention therefore provides a vehicle windscreen having a cover, for use in transit which covers the entire glass area of the windscreen, and overlaps the surrounding frame area and which comprises a transparent thermoplastic film, said film having a coating of a pressure-sensitive adhesive on one facer of the film, to contact the windscreen.

The transparent thermoplastic film may be a propylene polymer.

The pressure-sensitive adhesive is preferably an acrylic based material.

The film is preferably sufficiently large to cover not only the windscreen glass area, but also at least part of the surrounding frame area, to prevent access of dirty water to any corners, cracks or channels which might cause such water to accumulate.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

An embodiment of the invention is described by way of example, with reference to the accompanying drawings, wherein.

DESCRIPTION OF THE INVENTION

Figure 1:
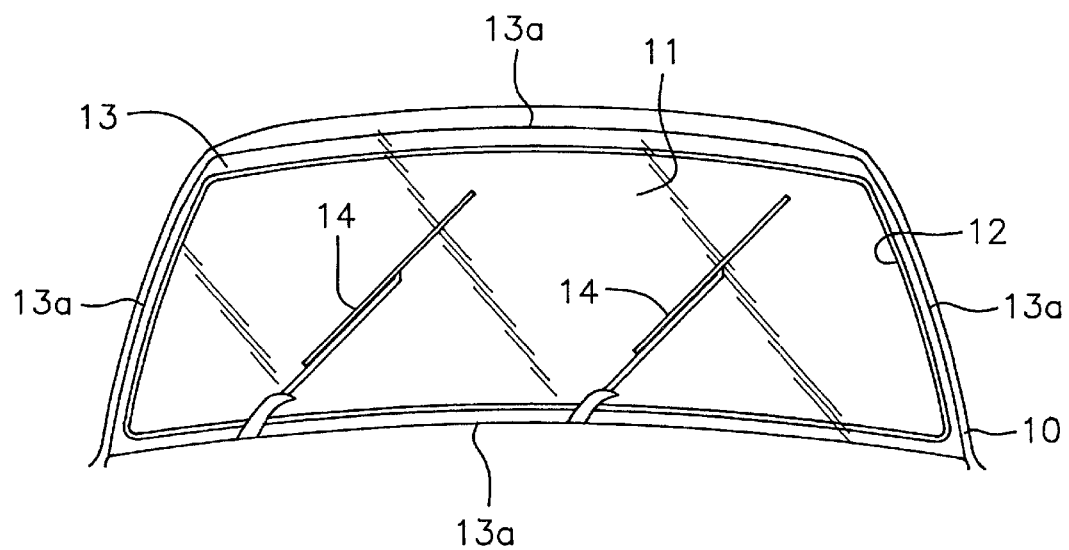
FIG. 1 is a view of a vehicle wind screen protected by a windscreen cover according to this invention.

Although only one preferred embodiment of the invention is explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

As shown in FIG. 1 a vehicle 10 (only partially shown) has a windscreen 121, surrounded by a frame 12, by means of which the windscreen is held in the bodywork of the vehicle. The windscreen 11 is protected by a removable cover 13, the edges 13a of which extend beyond the frame 12 to partially overlie the bodywork. The cover 13 is also provided below windscreen wipers 14, which can be used over the screen cover 13.

Figure 2:
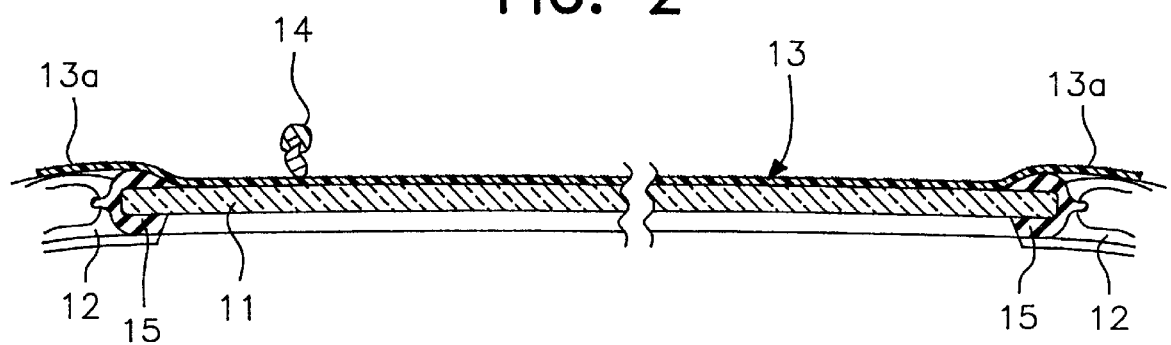
FIG. 2 is a fragmentary cross section of the windscreen and windscreen cover.

This latter feature is more clearly shown in FIG. 2, where the edges of the screen 11 are shown to be received in seals 15, received in the frame 12. The edges 13a extend sufficiently beyond the frame 12 to cover any cracks, channels or water-retaining angles arising between the screen 11 and the seal 15 or frame 12, so that accumulation of water in any such water traps is avoided.

Figure 3:
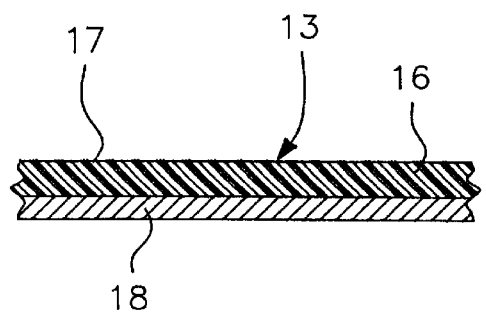
FIG. 3 is an enlarged sectional view of the cover itself.

The screen cover 13, as shown in FIG. 3, comprises a film 16 of a propylene polymer or co-polymer, which is transparent and thermoplastic and provides a smooth outer surface 17 which provides no resistance to the operation of a wiper blade 14 and thus has no tendency to peel, ruche or tear under the action of the wiper blade.

This enables the vehicle to be driven, e.g. to and from a storage location or onto and from a ship during transit of the vehicle for delivery, with the windscreen cover 13 in place. The windscreen cover can thus be placed on the windscreen at the factory before despatch, without impairing the usual delivery routines which require the vehicle to be driven occasionally.

The film 16 has an adhesive backing 18, comprising a pressure-sensitive acrylic-based adhesive, which is sufficiently strong enough to resist any loading imposed by operation of wiper blades 14, but can nevertheless be easily removed by peeling from the windscreen 11 when it is necessary to remove the cover 13.

A suitable film for the film 16 by way of example comprises a polypropylene film with the following properties:

| | |
|---|---|
| Density | 0.91 g/cm$^3$ |
| Thickness | 47 microns |
| Load at break | 70N/25 mm (machine direction) |
| Elongation at break | 600% (machine direction) |
| Coefficiemt of friction | 0.2 |
| Gloss | 85% |
| Peel adhesion strength | 100 g/25 mm |

The adhesive backing 18 is in a preferred embodiment a coating on one side of the film 16 comprising 15.7 g/m$^2$ of a solvent-based acrylic pressure sensitive adhesive using dimethylene diisocyanate (MDI) in a toluene solvent as a curing reagent.

The film preferably has a density in the range 0.75–1.0 g/cm$^3$; a thickness in the range 20–1.50 microns; load at break in the range 30–100 N/25 mm; elongation at break in the range 300–800%; coefficient of friction 0.05–0.8; and peel adhesion strength 30–150 g/25 mm, A windscreen cover as described will prevent dirty, e.g. rust containing water from accumulating on or about the edges of the windscreen and thus prevent the occurrence of unsightly and potentially damaging rust stains on the windscreen or its immediate frame.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. In combination, a vehicle windscreen having a main glazed area, a surrounding frame, and a transparent cover overlaying the main glazed area and at least part of the surrounding frame, said cover comprising a transparent thermoplastic film with a face, said film having a coating of a pressure-sensitive adhesive on the face of said film which contacts the main glazed area of the windscreen.

2. The combination according to claim 1, wherein said transparent thermoplastic film comprises a polymer of propylene.

3. The combination according to claim 1, wherein said pressure sensitive adhesive is an adhesive with an acrylic based material.

4. The combination according to claim 1, wherein the cover is applied below any wiper blades present, and presents a smooth outer surface after application to the windscreen to enable the wiper blades to be operated with the cover in place.

5. The combination according to claim 1, wherein said pressure-sensitive adhesive has a composition to enable the cover to be removed from the windscreen by peeling from the windscreen without leaving any visible residue on the windscreen after the film has been removed.

6. The combination according to claim 1, having a cover, wherein the film has a density in the range of 0.75–1.0 g/cm$^3$, a thickness in the range 20–150 microns; load at brake in the range 30–100N/25 mm; elongation at break in the range 300–800%; coefficient of friction 0.05–0.8; and peel adhesion strength 30–150 g/25 mm.

7. The combination of claim 1, wherein said transparent cover overlies a major portion of said surrounding frame.

8. The combination of claim 1, wherein said transparent cover overlies substantially all of said surrounding frame.

9. The combination of claim 1, wherein said transparent cover comprises a single layer of transparent thermoplastic film.

10. A vehicle windscreen cover, for vehicles in transit, said cover comprising:

a transparent thermoplastic film which covers an entire glass area of the vehicle windscreen and overlays a surrounding frame area, and which has a coating of a pressure-sensitive adhesive on a face of said film for contacting the vehicle windscreen, said adhesive comprising a solvent-based acrylic pressure sensitive adhesive using dimethylene diisocyanate (MDI) in a toluene solvent as a curing reagent.

11. The vehicle windscreen cover according to claim 10 wherein the adhesive is applied at a weight of 15.7 g/m$^2$.

* * * * *